(12) United States Patent
Seita

(10) Patent No.: US 8,651,752 B2
(45) Date of Patent: Feb. 18, 2014

(54) CAMERA

(75) Inventor: Masato Seita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 13/431,653

(22) Filed: Mar. 27, 2012

(65) Prior Publication Data

US 2012/0257883 A1 Oct. 11, 2012

(30) Foreign Application Priority Data

Apr. 8, 2011 (JP) .................................. 2011-086513

(51) Int. Cl.
*G03B 19/12* (2006.01)
*G03B 15/00* (2006.01)
*G03B 17/00* (2006.01)

(52) U.S. Cl.
USPC ............................. 396/358; 396/352; 396/447

(58) Field of Classification Search
USPC ................... 396/358, 352, 354, 447
See application file for complete search history.

(56) References Cited

U.S. PATENT DOCUMENTS

| | | | |
|---|---|---|---|
| 5,768,644 A | 6/1998 | Tanabe | |
| 6,003,999 A | 12/1999 | Kitaoka | |
| 2009/0245779 A1 | 10/2009 | Negita | |
| 2010/0027091 A1 | 2/2010 | Hwang | |

FOREIGN PATENT DOCUMENTS

| | | |
|---|---|---|
| EP | 2469335 A1 | 6/2012 |
| JP | 9-203972 A | 8/1997 |
| JP | 9-274249 A | 10/1997 |
| JP | 10-039410 A | 2/1998 |
| JP | 2008-287110 A | 11/2008 |
| JP | 2010-002868 A | 1/2010 |

OTHER PUBLICATIONS

U.S. Appl. No. 13/431,765, filed Mar. 27, 2012, Masato Seita.

*Primary Examiner* — Rochelle-Ann J Blackman
(74) *Attorney, Agent, or Firm* — Canon USA Inc IP Division

(57) ABSTRACT

A mirror contact member includes a first eccentric portion that is eccentric with respect to a rotation center of the mirror contact member, and a second eccentric portion that is eccentric with respect to the rotation center of the mirror contact member substantially at the same eccentricity as that of the first eccentric portion. When a mirror is displaced to a mirror-down state, the mirror is contacted with the first eccentric portion. A bounce regulation member is disposed to be rotatable about the second eccentric portion.

4 Claims, 10 Drawing Sheets

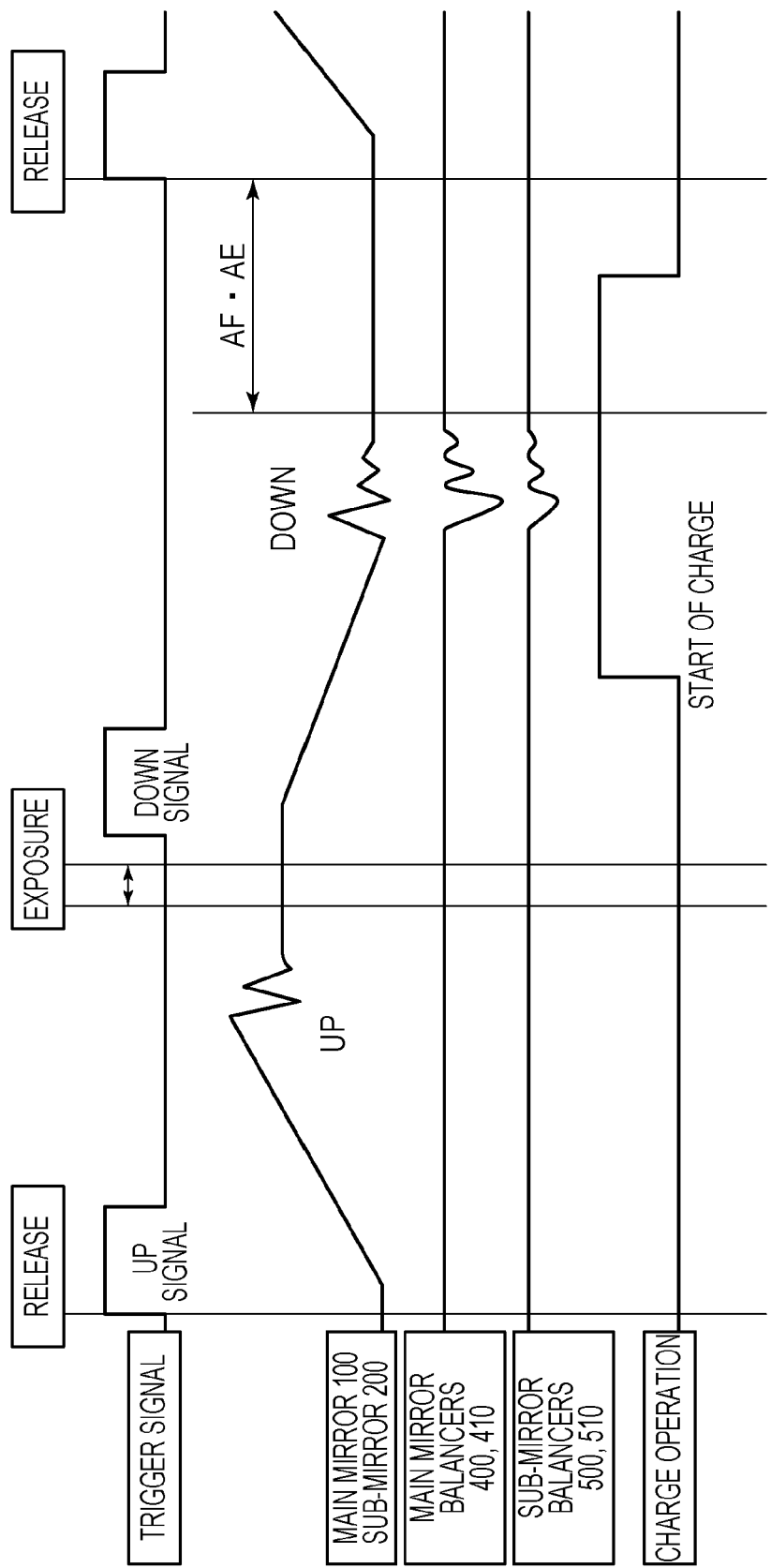

CAMERA

BACKGROUND OF THE INVENTION

1. Field of the Invention

The present invention relates to a camera such as a single-lens reflex camera, and more particularly to a camera including a mechanism that suppresses a bounce (rebound) of a rotatable mirror.

2. Description of the Related Art

A single-lens reflex camera includes a main mirror for reflecting light from an object and introducing the reflected light to an optical system of a finder, and a sub-mirror for introducing the light having passed through the main mirror to a focus detector. The main mirror and the sub-mirror are displaceable to a mirror-down state where both the mirrors are positioned in an optical path for photographing, and to a mirror-up state where both the mirrors are retracted away from the optical path for photographing.

When the main mirror and the sub-mirror are displaced to the mirror-down state, the main mirror and the sub-mirror strike against a stopper disposed on a mirror box, whereby the main mirror and the sub-mirror are caused to bounce (rebound off the stopper). A finder image can be stabilized by suppressing the bounce of the main mirror. Further, a focus detecting operation can be started earlier by suppressing the bounce of the sub-mirror.

Japanese Patent Laid-Open No. 9-203972 discloses the following technique.

A main mirror 1 and a main-mirror holding frame 2 are displaced to a mirror-down state and strike against a main-mirror receiving member 29 that is in an observing position. Upon the main mirror 1 and the main-mirror holding frame 2 striking against the main-mirror receiving member 29, an inertial brake plate 21 and the main-mirror receiving member 29 are rotated. In conjunction with the rotation of the inertial brake plate 21 and the main-mirror receiving member 29, a sub-mirror retaining member 31 is rotated to come into a bounce locus of a sub-mirror 11. As a result, a sub-mirror retainer 32 of the sub-mirror retaining member 31 contacts with the sub-mirror 11 and reduces the bounce thereof.

SUMMARY OF THE INVENTION

With the technique disclosed in Japanese Patent Laid-Open No. 9-203972, when the main mirror 1 and the main-mirror holding frame 2 strike against the main-mirror receiving member 29, the momentum of the main mirror 1 and the main-mirror holding frame 2 is transferred to the inertial brake plate 21 and the main-mirror receiving member 29.

In Japanese Patent Laid-Open No. 9-203972, however, the sub-mirror does not include such a bounce suppression mechanism as that provided for the main mirror, and a bounce range of the sub-mirror is just restricted. Further, when a mirror-down position of the mirror is adjusted, the mirror bounce range is changed.

An embodiment of the present invention provides a camera including a mirror, a mirror contact member with which the mirror is contactable, and a bounce regulation member including a bounce regulation portion with which the mirror is contacted when the mirror is bounced from the mirror contact member, wherein the mirror contact member is rotatably provided so as to be rotatable around a rotation center, wherein the mirror contact member includes a first eccentric portion that is eccentric with respect to the rotation center of the mirror contact member, and a second eccentric portion that is eccentric with respect to the rotation center of the mirror contact member substantially at the same eccentricity as that of the first eccentric portion, wherein when the mirror is displaced to a mirror-down state, the mirror is contacted with the first eccentric portion, and wherein the bounce regulation member is disposed to be rotatable about the second eccentric portion.

According to the embodiment of the present invention, there can be obtained the camera including a mirror driving mechanism in which the mirror bounce range is not changed when the mirror-down position of the mirror is adjusted.

Further features of the present invention will become apparent from the following description of exemplary embodiments with reference to the attached drawings.

BRIEF DESCRIPTION OF THE DRAWINGS

FIG. 3 is a chart to explain a mirror driving sequence.

DESCRIPTION OF THE EMBODIMENTS

A camera according to an embodiment of the present invention will be described below with reference to the drawings. The camera according to this embodiment is practiced as a single-lens reflex still camera using a silver halide film, or as a single-lens reflex digital camera using a CCD sensor or a MOS-type solid-state image pickup element.

Figure 1:
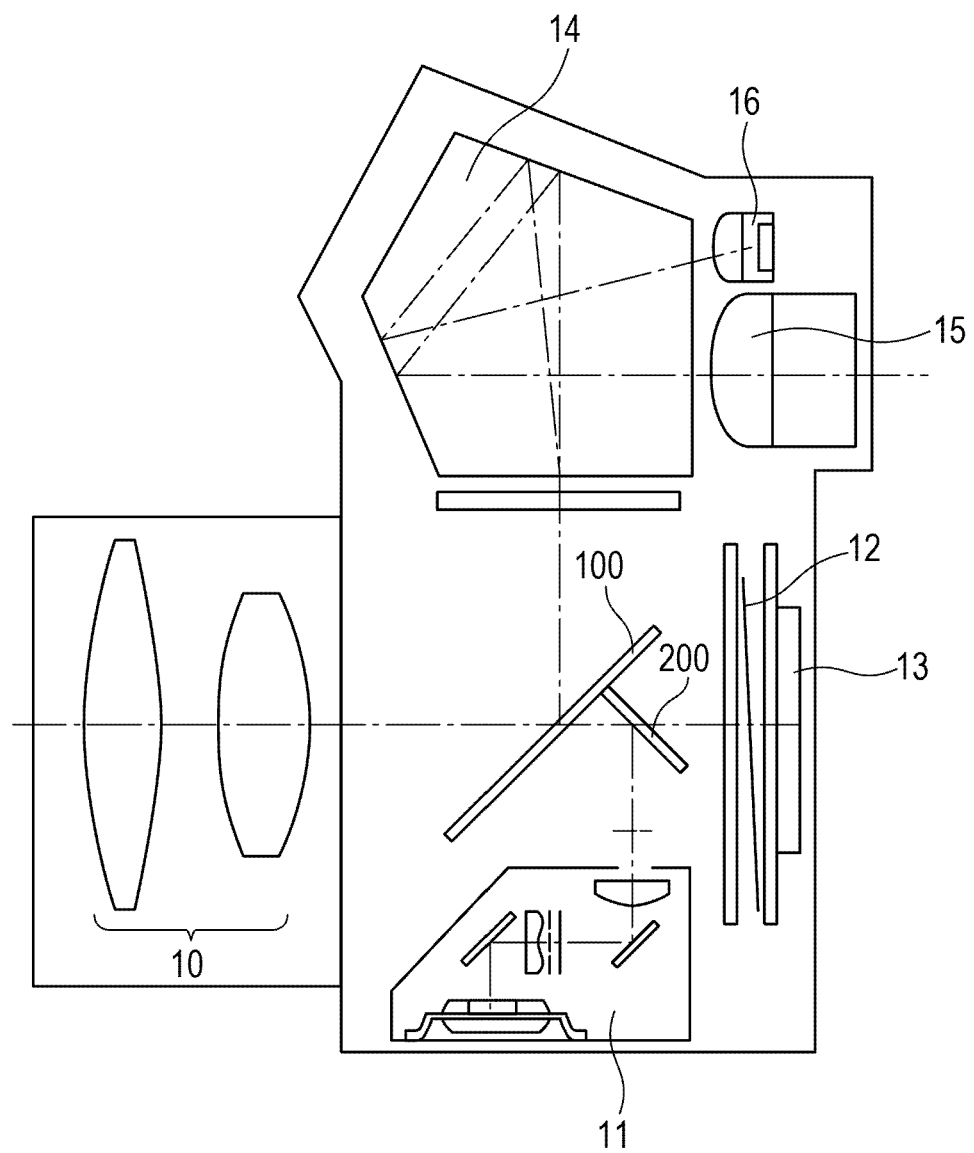
FIG. 1 is a schematic view illustrating the overall construction of a camera according to an embodiment of the present invention.

FIG. 1 is a schematic view illustrating the inner overall construction of the single-lens reflex digital camera according to the embodiment.

In FIG. 1, a photographing lens 10 is detachably attached to a body of the digital camera. An object image is focused on an image plane by the photographing lens 10. The photographing lens 10 is constituted, though not illustrated, by a lens driver, an aperture blade unit for exposure control, an aperture driver for driving the aperture blade unit, etc.

A main mirror 100 is constituted as a half mirror. When the main mirror 100 is in a mirror-down state, the main mirror 100 reflects the object image, which is focused by the photographing lens 10, toward a focusing screen. At that time, the main mirror 100 allows a part of the object image to pass therethrough toward a sub-mirror 200. The sub-mirror 200 reflects the part of the object image (light), having passed through the main mirror 100, toward a focus detector 11.

The main mirror 100 is driven by a mirror driving mechanism (described later) such that the main mirror 100 is displaced to either a mirror-down state where it is positioned in an optical path of an object light flux, thereby introducing the object image to the focusing screen, or a mirror-up state where it is retracted away from the optical path of the object light flux, thereby introducing the object image to an image pickup element 13.

The sub-mirror 200 is displaced in conjunction with the main mirror 100 when the main mirror 100 is driven by the mirror driving mechanism (described later). More specifically, when the main mirror 100 is in the mirror-down state, the sub-mirror 200 introduces (directs) the light flux having passed through the main mirror 100 to the focus detector 11. On the other hand, when the main mirror 100 is in the mirror-up state, the sub-mirror 200 is retracted away from the optical path of the object light flux together with the main mirror 100.

A pentaprism 14 reflects the object image focused on the focusing screen after converting it to a normal erect image.

An eyepiece lens 15 introduces, to the eye of a photographer, the object image that has been converted to the normal erect image and reflected by the pentaprism 14.

A photometric device 16 measures the brightness of the object image, which has been focused on the focusing screen, through the pentaprism 14. Exposure control during an exposure is performed in accordance with an output signal of the photometric device 16.

The focus detector 11 detects a defocus amount of the object image. The lens driver for the photographing lens 10 is controlled in accordance with an output signal of the focus detector 11, whereby focus adjustment is performed.

The shutter device 12 mechanically controls the incidence of the object light flux on the image surface.

The image pickup element 13 picks up the object image focused by the photographing lens 10 and converts it to electrical signals. For example, a two-dimensional image pickup device of the CCD or MOS type is used as the image pickup element 13.

The photographing operation in the digital camera according to this embodiment will be described below.

Before the start of photographing, the object image incoming through the photographing lens 10 is brought into a state where the photographer can confirm the object image, directed by the main mirror 100 and the pentaprism 14, through the eyepiece lens 15. At that time, a part of the object image enters the focus detector 11 through the sub-mirror 200. When the photographer operates a switch, the photographing lens 10 is driven in accordance with information of the object distance detected by the focus detector 11. In such a manner, focusing can be performed. Further, the photometric device 16 measures the object brightness, whereby a lens aperture value and a shutter exposure time are determined.

When photographing is performed with a release operation by the photographer, the main mirror 100 and the sub-mirror 200 are retracted upwards away from the optical path for photographing and blades of the shutter device 12 are opened, thus causing the object image to enter the image pickup element 13. After the elapse of a proper exposure time, the blades of the shutter device 12 are operated to close an opening of an image frame, and the main mirror 100 and the sub-mirror 200 are returned into the optical path for photographing. The photographing operation is thus completed.

The operation of the mirror driving mechanism will be described below with reference to FIGS. 2A to 2C.

Figure 2C:
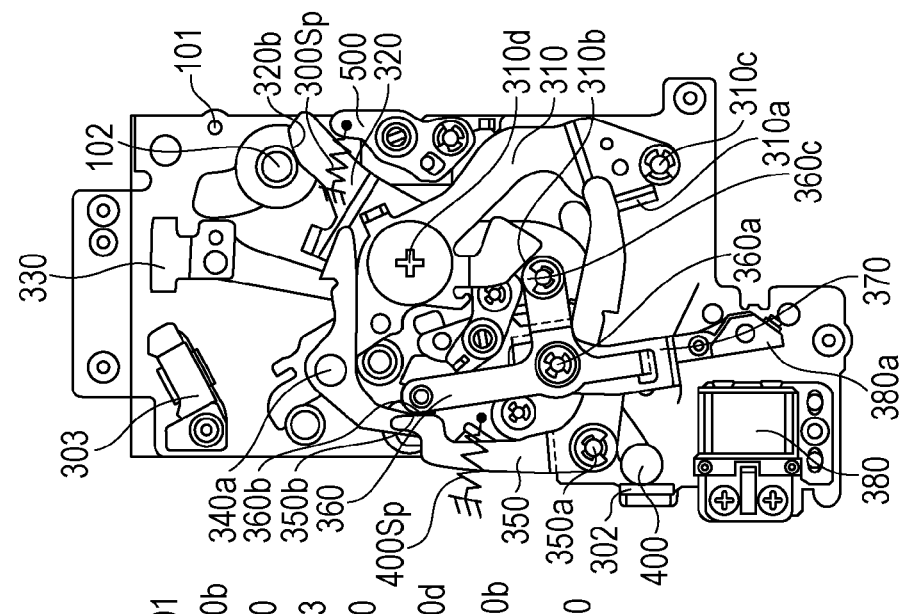
FIGS. 2A to 2C are explanatory views to explain the operation of a mirror driving mechanism.
Figure 2B:
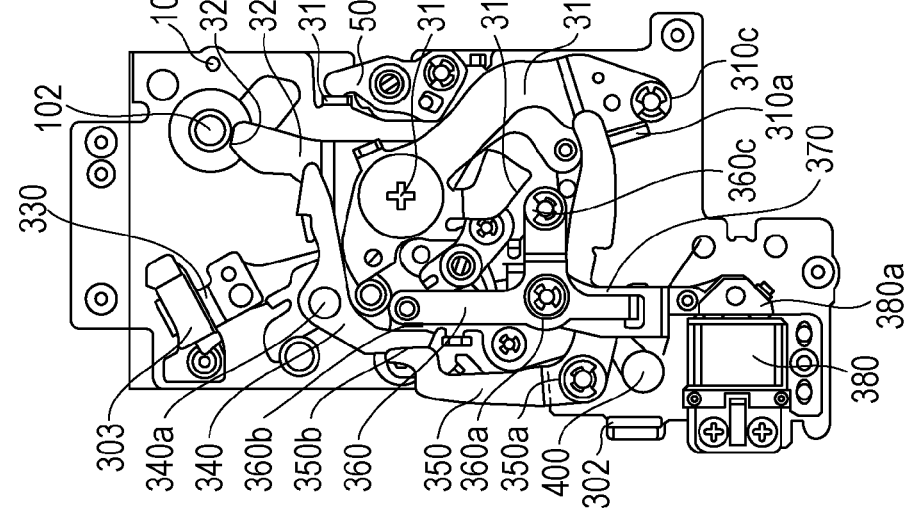
Figure 2A:
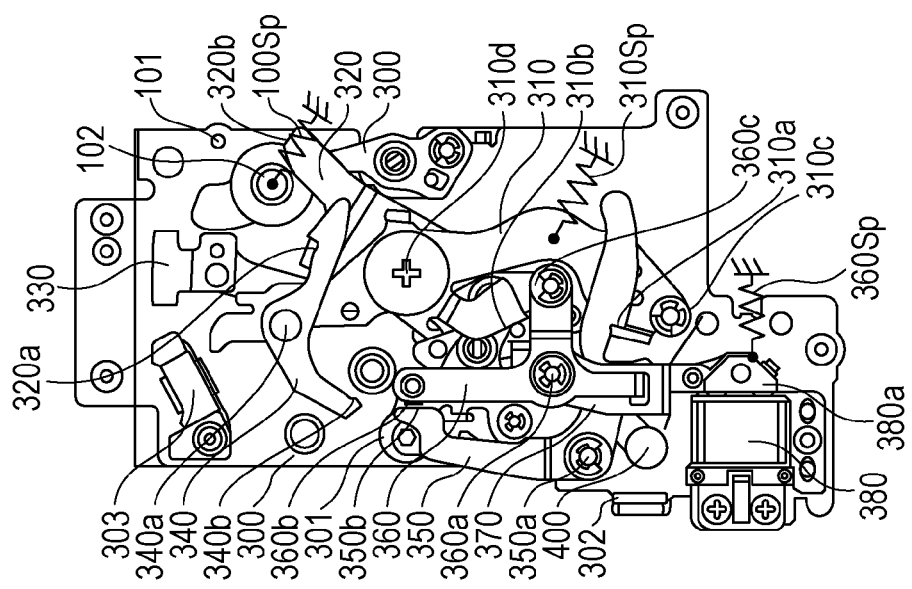

FIG. 2A illustrates a standby state before release, i.e., a state after completion of mirror-down and charge operations.

A base plate 300 mounting the mirror driving mechanism thereon includes a hole to which a rotation shaft 101 of the main mirror 100 is fitted, and an arc-shaped hole along which a drive shaft 102 of the main mirror 100 is turned. A mirror-down spring 100Sp for biasing the main mirror 100 in the down-direction is held against the drive shaft 102 of the main mirror 100.

A mirror lever 310 is rotated about a rotation center 310*d*. A down-hook lever 340 is attached to the mirror lever 310. The down-hook lever 340 is rotated about a rotation center 340*a*. An attraction lever 370 and a detachment lever 360 are integral with each other and are both rotated about a rotation center 360*a* of the detachment lever 360. An attraction portion 380*a* attractable by an electromagnet 380 is fixed to a distal end of the attraction lever 370.

The electromagnet 380 includes a magnet, a coil, and a yoke. In a non-energized state, the attraction portion 380*a* is held in close contact with the yoke by a magnetic force. When the coil is energized, the magnetic force is canceled and the attraction portion 380*a* is detached away from the yoke.

A detachment spring 360Sp biases the attraction portion 380*a* in the direction in which the attraction portion 380*a* is detached away from the yoke. In other words, the detachment spring 360Sp biases the attraction lever 370 in the direction in which the attraction lever 370 is rotated about the rotation center 360*a* of the detachment lever 360 to the right as viewed in FIG. 2A. When the attraction portion 380*a* is attracted to the yoke, the attraction portion 380*a* is held at the yoke by a greater force than the biasing force of the detachment spring 360Sp.

In the standby state before release, as illustrated in FIG. 2A, an up-hook lever 350 and an engagement portion 310*a* of the mirror lever 310 are engaged with each other. With that engagement, the mirror lever 310 is kept in the state, illustrated in FIG. 2A, against the biasing force of a mirror-up spring 310Sp. Further, in the state illustrated in FIG. 2A, the down-hook lever 340 and an engagement portion 320*a* of a mirror drive lever 320 are engaged with each other.

A mirror-up operation will be described below.

When a pulse is supplied to the electromagnet 380 in accordance with a release signal, the attraction lever 370 fixed with the attraction portion 380*a* and the detachment lever 360 integral with the attraction lever 370 are rotated left (counterclockwise) by the spring force of the detachment spring 360Sp about the rotation center 360*a* of the detachment lever 360.

When the detachment lever 360 is rotated left, a roller 360*b* of the detachment lever 360 is contacted with a contact portion 350*b* of the up-hook lever 350, whereupon the up-hook lever 350 is rotated left about a rotation center 350*a*. With the left rotation of the up-hook lever 350, the engagement between the up-hook lever 350 and the engagement portion 310*a* of the mirror lever 310 is disengaged.

When the engagement between the up-hook lever 350 and the engagement portion 310*a* of the mirror lever 310 is disengaged, the mirror lever 310 is rotated left about the rotation center 310*d* by the spring force of the mirror-up spring 310Sp. At that time, because the engagement portion 320*a* of the mirror drive lever 320 is engaged with the down-hook lever 340, the mirror drive lever 320 is rotated left about the rotation center 310*d* of the mirror lever 310. With the left rotation of the mirror drive lever 320, a cam portion 320*b* of the mirror drive lever 320 pushes up the main mirror drive shaft 102, whereby the mirror-up operation is performed.

The spring force of the mirror-up spring 310Sp is sufficiently greater than that of the mirror-down spring 100Sp. Therefore, the mirror-up operation can be performed at a high speed.

FIG. 2B illustrates a state after completion of the mirror-up operation.

An operation sensor 330 is fixed to the mirror drive lever 320, and the completion of the mirror-up operation is detected by an up-switch (UPSW) 303 including a photo interrupter.

The mirror lever 310 includes an attraction cam portion 310b. When the mirror lever 310 is rotated left, the attraction cam portion 310b is contacted with a roller 360c of the detachment lever 360, thereby rotating the detachment lever 360 right (clockwise) against the spring force of the detachment spring 360Sp. With the right rotation of the detachment lever 360, the attraction portion 380a in a state detached from the electromagnet 380 is attracted to the electromagnet 380 again.

Further, because the engagement portion 320a of the mirror drive lever 320 is engaged with the down-hook lever 340, the down-hook lever 340 is rotated left about the rotation center 310d of the mirror lever 310 together with the mirror lever 310 and the mirror drive lever 320. An unhook portion 340b of the down-hook lever 340 is moved to a position where the unhook portion 340b is contactable with the roller 360b of the detachment lever 360. After a bounce generated with the mirror-up operation has settled, an exposure operation is performed, following which the process advances to a mirror-down step.

The mirror-down operation will be described below.

When a pulse is supplied to the electromagnet 380 in the mirror-up state of FIG. 2B, the attraction lever 370 and the detachment lever 360 both associated with the attraction portion 380a are rotated left (counterclockwise) by the spring force of the detachment spring 360Sp.

When the detachment lever 360 is rotated left, the roller 360b of the detachment lever 360 is contacted with the unhook portion 340b of the down-hook lever 340, and the down-hook lever 340 is rotated right (clockwise) about the rotation center 340a. With the right rotation of the down-hook lever 340, the engagement between the down-hook lever 340 and the engagement portion 320a of the mirror drive lever 320 is disengaged. When the engagement between the down-hook lever 340 and the engagement portion 320a of the mirror drive lever 320 is disengaged, the spring force of the mirror down-spring 100Sp is caused to act on the main mirror drive shaft 102. As a result, the mirror drive lever 320 is rotated right about the rotation center 310d of the mirror lever 310.

FIG. 2C illustrates a state after completion of the mirror-down operation.

A main mirror balancer 400 is disposed on the base plate 300 of the mirror box. When the main mirror 100 is contacted with the main mirror balancer 400, the main mirror balancer 400 is rotated right against the spring force of a main mirror balancer spring 400Sp, thereby damping a shock generated with the mirror-down operation of the main mirror 100. In addition, the main mirror balancer 400 strikes against a damper 302 at a fore end of the main mirror balancer 400 when it is rotated right, thereby further damping the shock imposed on the main mirror balancer 400.

A sub-mirror balancer 500 is disposed on the base plate 300 of the mirror box. When the sub-mirror 200 is contacted with the sub-mirror balancer 500, the sub-mirror balancer 500 is rotated right against the spring force of a sub-mirror balancer spring 500Sp (see FIGS. 5A and 6), thereby damping a shock generated with the mirror-down operation of the sub-mirror 200.

A mirror charge operation will be described below.

A roller 310c disposed in a charge portion of the mirror lever 310 is pressed to the left by a charge lever (not illustrated) in the state of FIG. 2C, whereby the mirror lever 310 is rotated right about the rotation center 310d of the mirror lever 310 against the spring force of the mirror-up spring 310Sp.

With the right rotation of the mirror lever 310, the attraction cam portion 310b of the mirror lever 310 is contacted with the roller 360c of the detachment lever 360, whereby the detachment lever 360 is rotated right against the spring force of the detachment spring 360Sp.

With the right rotation of the detachment lever 360, the attraction lever 370 is also rotated right and the attraction portion 380a in the detached state is attracted to the electromagnet 380 again.

When the mirror lever 310 is rotated right in the state of FIG. 2C, the down-hook lever 340 is engaged with the engagement portion 320a of the mirror drive lever 320, and the up-hook lever 350 is engaged with the engagement portion 310a of the mirror lever 310. As a result, the mirror charge operation is completed and the mirror driving mechanism is returned to the state of FIG. 2A.

While in this embodiment, as described above, the electromagnet is utilized as a trigger for starting the mirror-up operation and the mirror-down operation and the springs are used as driving sources for the mirror-up operation and the mirror-down operation, the mirror driving mechanism is not limited to the above-described arrangement. For example, an electromagnetic motor, a stepping motor, or an ultrasonic motor may also be used as the driving source in the mirror driving mechanism.

However, when the electromagnetic motor is used to perform the mirror operation, the operation start time tends to vary due to, e.g., the inertia and the temperature characteristic of the motor. Further, a speed reduction mechanism is required and a mechanical delay time occurs in transmission of a driving force. For that reason, it is suitable, as in the above-described embodiment, to employ the electromagnet as the trigger and to utilize the spring force for performing the mirror operation in the mirror driving mechanism that requires a high speed and high accuracy.

FIG. 3 is a chart to explain a mirror driving sequence in the camera according to this embodiment. In the mirror driving sequence in the camera according to this embodiment, as illustrated in FIG. 3, a charge operation is started before the completion of the mirror-down operation. Even during arithmetic operations for AF (auto-focusing) and AE (auto-exposure), therefore, the charge operation can be continued regardless of accuracy in stopping the mirror. Further, a variation in the charge operation does not affect the mirror operating speed and the arithmetic operation times for AF and AE. An influence of such a variation upon continuous shooting is also small.

The constructions of the main mirror balancers 400 and 410 and the sub-mirror balancers 500 and 510 will be described below with reference to FIGS. 4, 5A and 5B.

A main mirror frame 100a for holding the main mirror 100 has hinge shaft portions (rotation shafts) 101, which are formed respectively at the left and right sides of the main mirror frame 100a and which serve as rotation centers. A drive shaft 102 for rotating the main mirror 100 is formed at one side of the main mirror frame 100a. Contact plates 103 and 104 formed by members separate from the main mirror frame 100a are disposed respectively at left and right distal ends of the main mirror 100.

The main mirror frame 100a is made of a light material, such as aluminum or resin, in many cases to reduce the inertia moment. If the contact plates 103 and 104 are made of the same material as that of the main mirror frame 100a, durability of the contact plates 103 and 104 may deteriorate. For that reason, the contact plates 103 and 104 are made of a material, such as stainless steel, having higher strength than the material of the main mirror frame 100a, or formed of rubber members having a shock absorbing ability.

Figure 4:
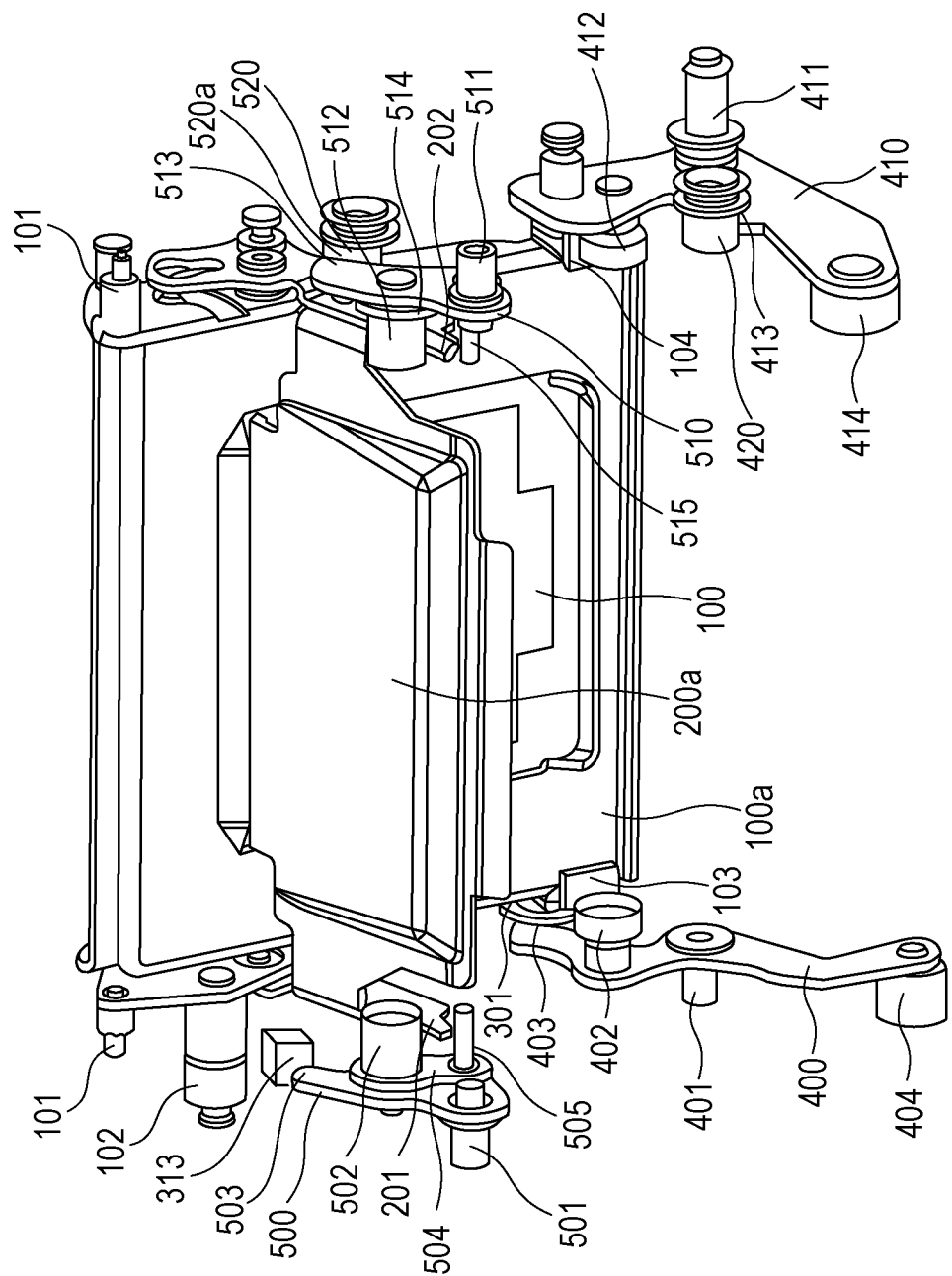
FIG. 4 is an explanatory view illustrating the constructions of a main mirror balancer and a sub-mirror balancer.
Figure 5A:
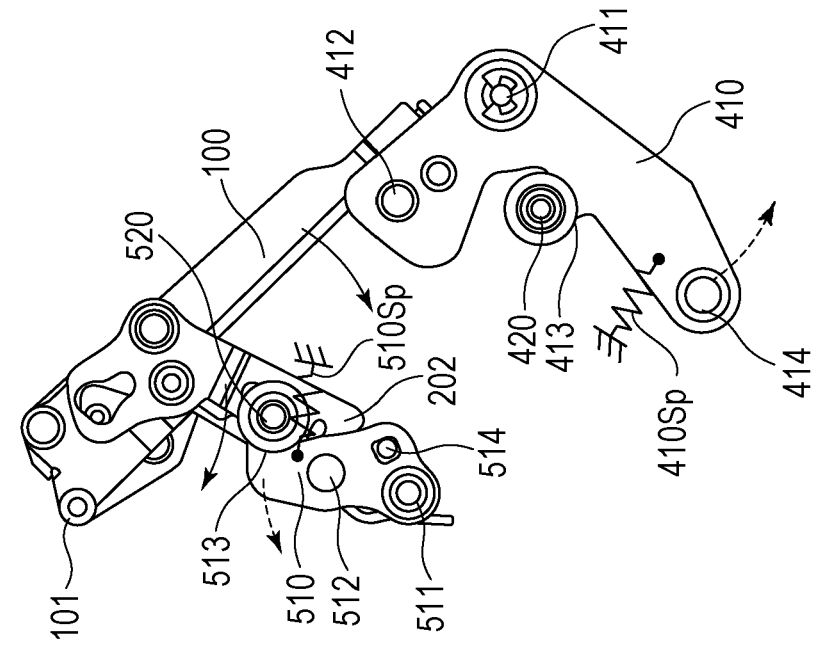
FIGS. 5A and 5B are explanatory views to explain the operations of the main mirror balancer and the sub-mirror balancer.

As illustrated in FIGS. 4 and 5A, the main mirror balancer 400 is disposed on the left side (one side) of the main mirror frame 100a. The main mirror balancer 400 includes a shaft portion 401 serving as a rotation center, a contact shaft 402, a main-mirror angle adjusting portion 403, and a balancer weight 404 made of a material having a large mass, such as brass.

Figure 5B:
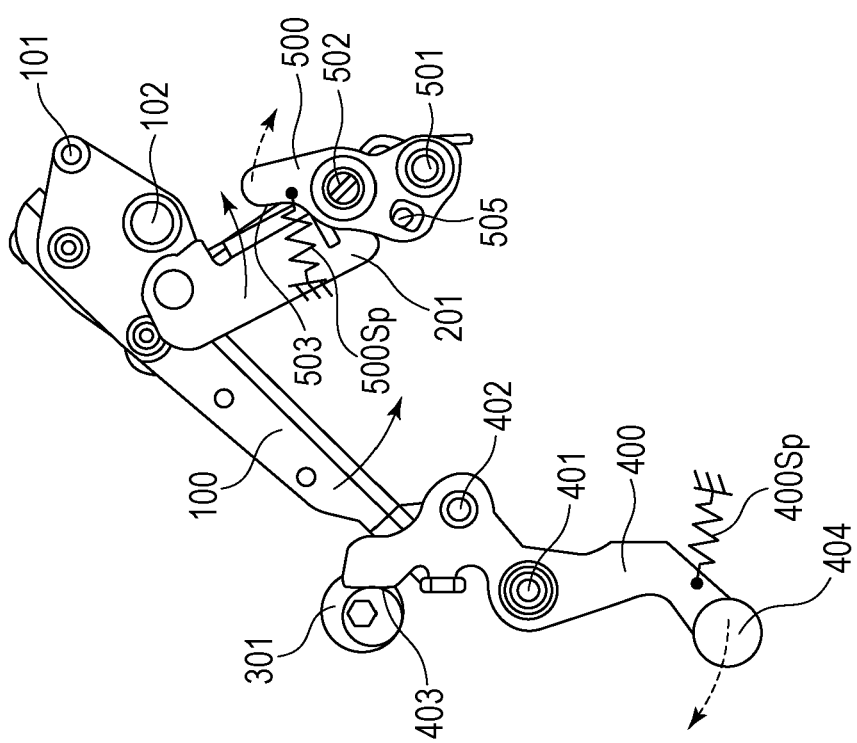

As illustrated in FIGS. 4 and 5B, the main mirror balancer 410 is disposed on the right side (other side) of the main mirror frame 100a. The main mirror balancer 410 includes a shaft portion 411 serving as a rotation center, a contact shaft 412, a main-mirror angle adjusting portion 413, and a balancer weight 414 made of a material having a large mass, such as brass.

In the mirror-down state, the main-mirror angle adjusting portion 403 is contacted with an adjustment member 301 by the spring force of the spring 400Sp. Further, the state where the contact plate 103 of the main mirror 100 is contacted with the contact shaft 402 is held by the spring force of the mirror-down spring 100Sp. Similarly, in the mirror-down state, the main-mirror angle adjusting portion 413 is contacted with an adjustment member 420 by the spring force of a spring 410Sp. Further, the state where the contact plate 104 of the main mirror 100 is contacted with the contact shaft 412 is held by the spring force of the mirror-down spring 100Sp.

The adjustment member 301 has an eccentric shaft. By rotating the adjustment member 301 with a tool, therefore, the main mirror balancer 400 is rotated about the shaft portion 401, whereby a contact position between the contact shaft 402 and the contact plate 103 of the main mirror 100 is changed.

Similarly, the adjustment member 420 has an eccentric shaft. By rotating the adjustment member 420 with a tool, therefore, the main mirror balancer 410 is rotated about the shaft portion 411, whereby a contact position between the contact shaft 412 and the contact plate 104 of the main mirror 100 is changed.

In such a way, an angle of the main mirror frame 100a about the hinge shaft portions 101 and an inclination of the main mirror frame 100a in the left-and-right direction can be adjusted.

The sub-mirror 200 is held by a sub-mirror frame 200a such that the sub-mirror 200 is rotatable about rotation centers at side surfaces of the main mirror frame 100a. Contact portions 201 and 202 are formed respectively at the left and right sides of the sub-mirror frame 200a.

As illustrated in FIGS. 4 and 5A, the sub-mirror balancer 500 is disposed on the left side (one side) of the sub-mirror frame 200a. The sub-mirror balancer 500 includes a shaft portion 501 serving as a rotation center for the sub-mirror balancer 500, a contact shaft 502, an adjustment portion 503, and a sub-mirror lock lever 504 provided with a lock pin 505. The contact shaft 502 functions as a mirror contact member, the sub-mirror lock lever 504 functions as a bounce regulation member, and the sub-mirror balancer 500 functions as a rotation member.

In the mirror-down state, the adjustment portion 503 of the sub-mirror balancer 500 is contacted with an adjustment member 313 by the spring force of the spring 500Sp. The spring 500Sp functions as a biasing member. A state where the contact portion 201 of the sub-mirror frame 200a is contacted with the contact shaft 502 is held by the spring force of a sub-mirror spring (not illustrated).

As illustrated in FIGS. 4 and 5B, the sub-mirror balancer 510 is disposed on the right side (other side) of the sub-mirror frame 200a. The sub-mirror balancer 510 includes a shaft portion 511 serving as a rotation center for the sub-mirror balancer 510, a contact shaft 512, an adjustment portion 513, and a sub-mirror lock lever 514 provided with a lock pin 515. The contact shaft 512 functions as the mirror contact member, the sub-mirror lock lever 514 functions as the bounce regulation member, and the sub-mirror balancer 510 functions as the rotation member.

In the mirror-down state, the adjustment portion 513 of the sub-mirror balancer 510 is contacted with an adjustment member 520 by the spring force of a spring 510Sp. The spring 510Sp functions as the biasing member. A state where the contact portion 202 of the sub-mirror frame 200a is contacted with the contact shaft 512 is held by the biasing force of a sub-mirror spring (not illustrated).

In the balancer mechanism on the left side of the sub-mirror frame 200a illustrated in FIGS. 4 and 5A, the contact shaft 502 contacting with the contact portion 201 of the sub-mirror frame 200a has an eccentric shaft. Stated another way, the contact shaft 502 is rotatably mounted to the sub-mirror balancer 500, but a rotation center of the contact shaft 502 is offset from a center of an outer periphery 502a (see FIG. 6) thereof. So in particular the radius (distance) of the outer periphery 502a from the rotation center varies such that the maximum radius on one side is longer than the maximum radius on the opposite side.

Accordingly, by rotating the contact shaft 502 relative to the sub-mirror balancer 500, a contact position between the outer periphery 502a of the contact shaft 502 and the contact portion 201 of the sub-mirror frame 200a is changed. With such a mechanism, an angle of the sub-mirror 200 in the mirror-down state can be adjusted.

Further, the sub-mirror lock lever 504 is rotatable relative to a cylindrical portion 502b (see FIG. 6) of the contact shaft 502. As in the outer periphery 502a of the contact shaft 502, the cylindrical portion 502b is eccentric relative to the rotation center of the contact shaft 502. The outer periphery 502a of the contact shaft 502 functions as a first eccentric portion, and the cylindrical portion 502b of the contact shaft 502 functions as a second eccentric portion.

Therefore, even when the angle of the sub-mirror 200 is adjusted by rotating the contact shaft 502 relative to the sub-mirror balancer 500, the size of a gap in which the bounce of the sub-mirror 200 is to be settled is not changed. In other words, a bounce regulation range is not changed depending on the mirror-down position of the sub-mirror 200.

In the balancer mechanism on the right side of the sub-mirror frame 200a illustrated in FIGS. 4 and 5B, the contact shaft 512 contacting with the contact portion 202 of the sub-mirror frame 200a is formed as a shaft that is not rotatable relative to the sub-mirror balancer 510. The adjustment member 520 has an eccentric cylindrical portion 520a that is eccentric relative to the rotation center of the adjustment member 520. The adjustment portion 513 of the sub-mirror balancer 510 is contacted with the eccentric cylindrical portion 520a.

Accordingly, by rotating the adjustment member 520, the sub-mirror balancer 510 is rotated about the shaft portion 511, and a contact position between the contact shaft 512 and the contact portion 202 of the sub-mirror frame 200a is changed. With such a mechanism, the angle of the sub-mirror 200 in the mirror-down state can be adjusted.

Further, the sub-mirror lock lever 514 is rotatable relative to the contact shaft 512. Therefore, even when the contact position between the contact (positioning) shaft 512 and the contact (positioning) portion 202 of the sub-mirror frame 200a is changed by rotating the adjustment member 520, the size of a gap between the lock pin 515 and the contact portion 202 of the sub-mirror frame 200a is not changed.

Thus, even when the angle of the sub-mirror 200 is adjusted by rotating the adjustment member 520, the size of a gap in which the bounce of the sub-mirror 200 is to be settled is not changed. In other words, the bounce state is not changed depending on the mirror-down position of the sub-mirror 200.

In this embodiment, the balancer mechanisms on the left side and the right side of the main mirror 100 and the sub-mirror 200 differ in construction and shape from each other. The balancer mechanism on the right side of the sub-mirror frame 200a in this embodiment may be provided on the left side of the sub-mirror frame 200a, and the balancer mechanism on the left side of the sub-mirror frame 200a in this embodiment may be provided on the right side of the sub-mirror frame 200a.

Further, in this embodiment, the shaft portion 401 serving as a rotation shaft of the main mirror balancer 400 and the shaft portion 411 serving as a rotation shaft of the main mirror balancer 410 are arranged in coaxial relation. Stated another way, the main mirror balancer 400 and the main mirror balancer 410 are arranged such that the shaft portion 401 and the shaft portion 411 are coaxially positioned.

The shaft portion 501 serving as a rotation shaft of the sub-mirror balancer 500 and the shaft portion 511 serving as a rotation shaft of the sub-mirror balancer 510 are arranged in coaxial relation. Stated another way, the sub-mirror balancer 500 and the sub-mirror balancer 510 are arranged such that the shaft portion 501 and the shaft portion 511 are coaxially positioned.

With such an arrangement, it is easier to design the mirror driving mechanism such that the inertia moments of the main mirror balancers 400 and 410 on the left and right sides of the main mirror 100 are equal to each other. It is also easier to design the mirror driving mechanism such that the inertia moments on the left and right sides of the sub-mirror balancers 500 and 510 are equal to each other.

Moreover, even when the inertia moments of both the main mirror balancers on the left and right sides of the main mirror 100 are made different from each other, or when the inertia moments of both the sub-mirror balancers on the left and right sides of the sub-mirror 200 are made different from each other, the difference between the inertia moments can be easily confirmed.

Figure 6:
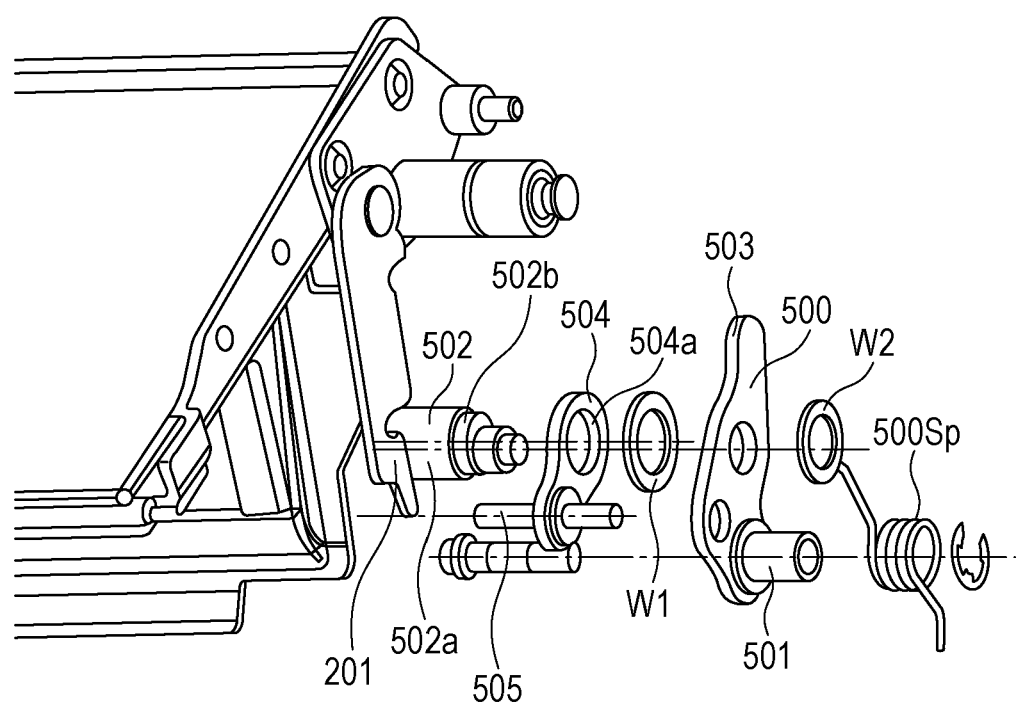
FIG. 6 is an exploded perspective view illustrating a sub-mirror balancer mechanism on the left side of a sub-mirror frame.

FIG. 6 is an exploded perspective view illustrating details of the balancer mechanism on the left side of the sub-mirror frame 200a in FIG. 4.

The contact shaft 502 includes the (eccentric) outer periphery 502a that is contacted with the contact portion 201 of the sub-mirror frame 200a, and the (eccentric) cylindrical portion 502b that is inserted through an engagement hole 504a of the sub-mirror lock lever 504. An eccentricity of the outer periphery 502a with respect to the rotation center of the contact shaft 502 is substantially equal to that of the cylindrical portion 502b of the contact shaft 502 with respect to the rotation center of the contact shaft 502. So the variation in radius, from the rotation center, of the outer periphery 502a is substantially the same as the variation in radius, from the rotation center, of the cylindrical portion 502b such that the point of maximum radius from the rotation center on the outer periphery 502a and the point of maximum radius from the rotation center on the cylindrical portion 502b are aligned in the direction of the rotation axis. So in the particular embodiment the outer periphery 502a and the cylindrical portion 502b are preferably both coaxially mounted cylindrical portions, having substantially the same diameter, with the offset of the rotation center from the geometric center being substantially the same for each portion.

As illustrated in FIG. 6, the sub-mirror lock lever 504, a washer W1, the sub-mirror balancer 500, and a washer W2 are successively attached to the contact shaft 502, and a distal end of the contact shaft 502 is crimped. Accordingly, the sub-mirror lock lever 504 is held between the contact shaft 502 and the sub-mirror balancer 500. In that state, the cylindrical portion 502b of the contact shaft 502 is contacted with an inner peripheral surface of the engagement hole 504a of the sub-mirror lock lever 504.

Since the washer W1 is arranged between the sub-mirror lock lever 504 and the sub-mirror balancer 500, the sub-mirror lock lever 504 is smoothly rotatable about the cylindrical portion 502b. Further, since the washer W2 is arranged on the right side of the sub-mirror balancer 500 as viewed in FIG. 6, the contact shaft 502 is rotatable relative to the sub-mirror balancer 500 even after the distal end of the contact shaft 502 has been crimped.

A torsion coil spring 500Sp is disposed over the shaft portion 501 of the sub-mirror balancer 500, the shaft portion 501 serving as the rotation center of the sub-mirror balancer 500. A movable end of the torsion coil spring 500Sp is held against on the lock pin 505 fixed to the lock lever 504 that is rotatable about the contact shaft 502 as the rotation center.

Thus, the sub-mirror lock lever 504 is biased by the spring force of the torsion coil spring 500Sp.

Figure 7:
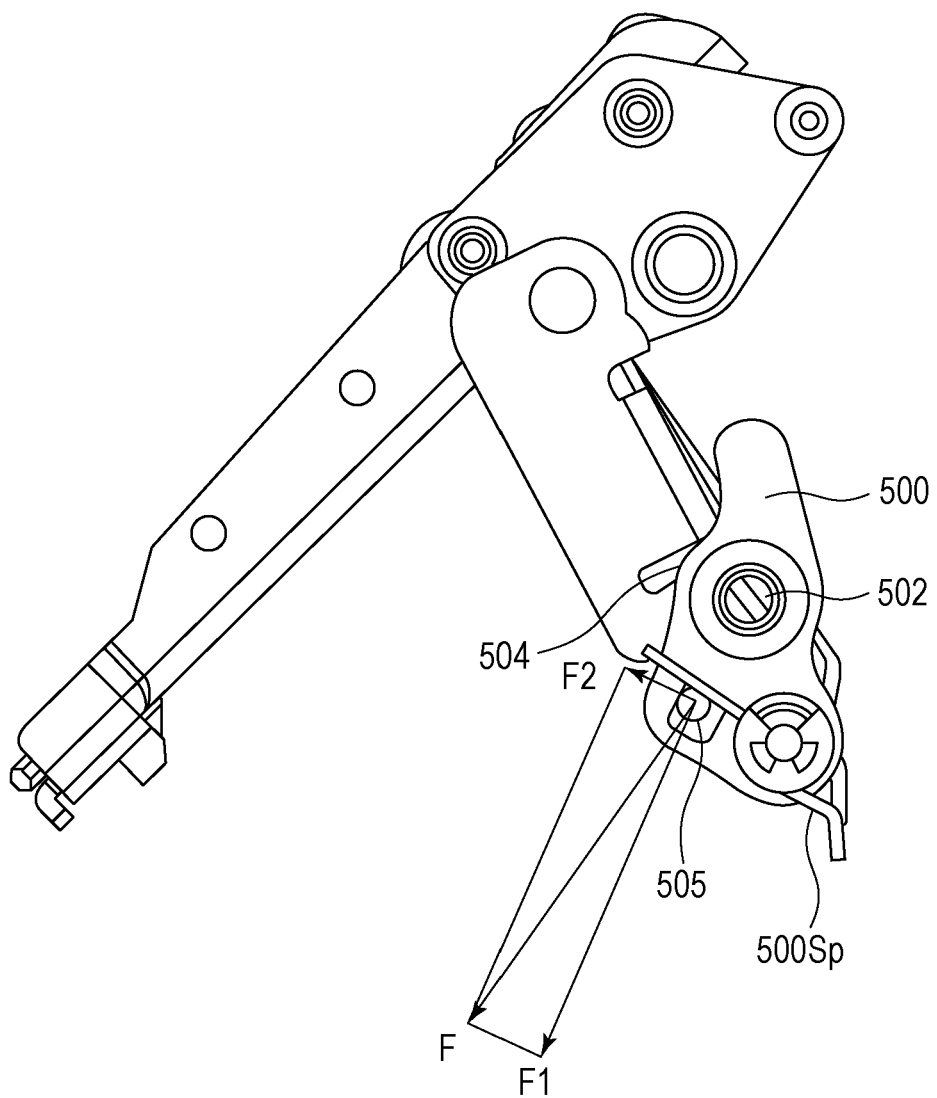
FIG. 7 is an explanatory view to explain the operation of the sub-mirror balancer mechanism on the left side of the sub-mirror frame.

The distal end of the contact shaft 502 is formed in a slotted shape (see e.g. FIG. 7). The angle of the sub-mirror 200 is adjusted by inserting a tool, such as a screwdriver, into a slot formed at the distal end of the contact shaft 502, and by rotating the contact shaft 502.

The operation of the balancer mechanism on the left side of the sub-mirror frame 200a in FIG. 4 will be described below with reference to FIGS. 7, 8A and 8B.

As described above, the torsion coil spring 500Sp is disposed over the shaft portion 501 serving as the rotation center of the sub-mirror balancer 500. A fixed end of the torsion coil spring 500Sp is held against a fixed portion (not illustrated), and a movable end of the torsion coil spring 500Sp is held against the lock pin 505 fixed to the lock lever 504.

The spring force of the torsion coil spring 500Sp is represented by a force F in FIG. 7. Depending on a contact angle between the lock pin 505 and the movable end of the torsion coil spring 500Sp, the force F is decomposed to (resolved into) a component force F1 in a direction that is perpendicular to the rotating direction of the sub-mirror lock lever 504, and a component force F2 in a direction normal to the component force F1. The torsion coil spring 500Sp is set such that the component force F1 acting as a force to rotate the sub-mirror balancer 500 is greater than the component force F2 acting as a force to rotate the sub-mirror lock lever 504, i.e., F1>F2.

The component force F1 provides a load when kinetic energy of the sub-mirror frame 200a is transferred to the sub-mirror balancer 500. Thus, even when the inertia moment of the sub-mirror balancer 500 cannot be set so large, the collision energy of the sub-mirror frame 200a can be absorbed by the load that is provided by the spring force of the torsion coil spring 500Sp.

The component force F2 is the spring force imposed on the sub-mirror lock lever 504. The component force F2 serves not only to provide a load when the contact portion 201 of the sub-mirror frame 200a is contacted with the lock pin 505, but also to return the sub-mirror lock lever 504 to a rebound regulation position when the contact portion 201 of the sub-mirror frame 200a is rebounded from the contact shaft 502 after riding over the lock pin 505.

Figure 8A:
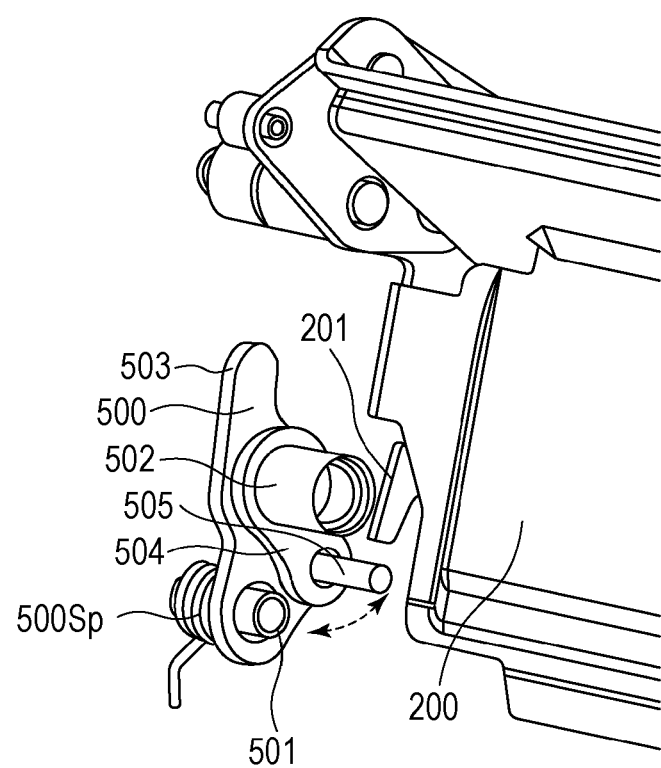
FIGS. 8A and 8B are explanatory views to explain the operation of the sub-mirror balancer mechanism on the left side of the sub-mirror frame.

FIG. 8A illustrates a state before the completion of the mirror-down operation, i.e., a state immediately before the contact portion 201 of the sub-mirror frame 200a is contacted with the lock pin 505. When the contact portion 201 is contacted with the lock pin 505, the lock pin 505 is rotated and thereafter the contact portion 201 is contacted with the contact shaft 502.

Figure 8B:
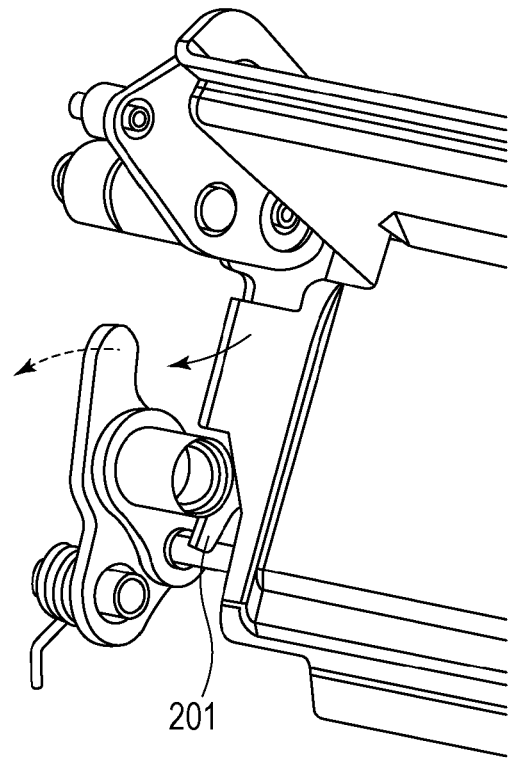

Collision energy generated at that time is converted to energy for rotating the sub-mirror balancer 500, and the sub-mirror balancer 500 is rotated as illustrated in FIG. 8B. The lock pin 505 is also rotated together with the sub-mirror balancer 500 such that the lock pin 505 can always effectuate the rebound regulation when the contact portion 201 of the sub-mirror frame 200a is rebound.

If the size of the sub-mirror balancer 500 is increased in its contour shape, a problem of interference with other components may occur. In consideration of such a problem, the sub-mirror balancer 500 is formed in a slender shape extending only in one direction from the shaft portion 501, which serves as the rotation center of the sub-mirror balancer 500, up to the adjustment portion 503. Thus, the contact shaft 502 can effectively function as a balancer weight. In other words, an angle formed by the contact between the contact shaft 502 and the contact portions 201 and the contact between the adjustment portion 503 and the adjustment member 313 with respect to the rotation center of the sub-mirror balancer 500 is set to be not larger than 90° in one embodiment.

When the sub-mirror 200 is displaced to the mirror-down state, the sub-mirror 200 is rotated in a direction in which it comes closer to an image pickup plane. Therefore, the sub-mirror balancers 500 and 510 are also moved in a direction toward the image pickup plane. As illustrated in FIG. 1, the shutter device 12 is disposed closely in front of the image pickup element 13. Hence, there is a risk that the sub-mirror balancers 500 and 510 may interfere with the shutter device 12 in the balancing operations.

Figure 9:
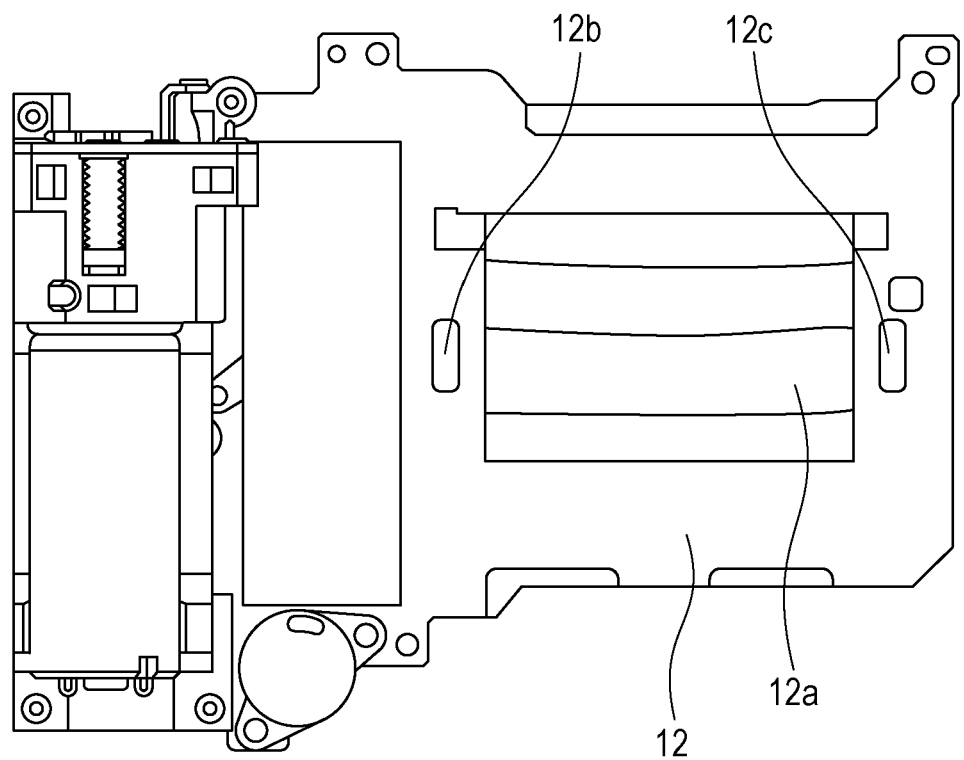
FIG. 9 is a front view of a shutter device.

FIG. 9 is a front view of the shutter device 12. As illustrated in FIG. 9, recesses 12b and 12c are formed in a plate, which is disposed on the object side of the shutter device 12, thereby providing allowances for movements of the sub-mirror balancers 500 and 510. Such an arrangement can increase an amount of energy absorbed by the sub-mirror balancers 500 and 510, and can provide a satisfactory mechanism for absorbing the bounce of the sub-mirror 200. The recesses 12b and 12c may be in the form of holes, which also provide a similar beneficial effect even when they are formed in continuation to an opening 12a for photographing.

Figure 10A:
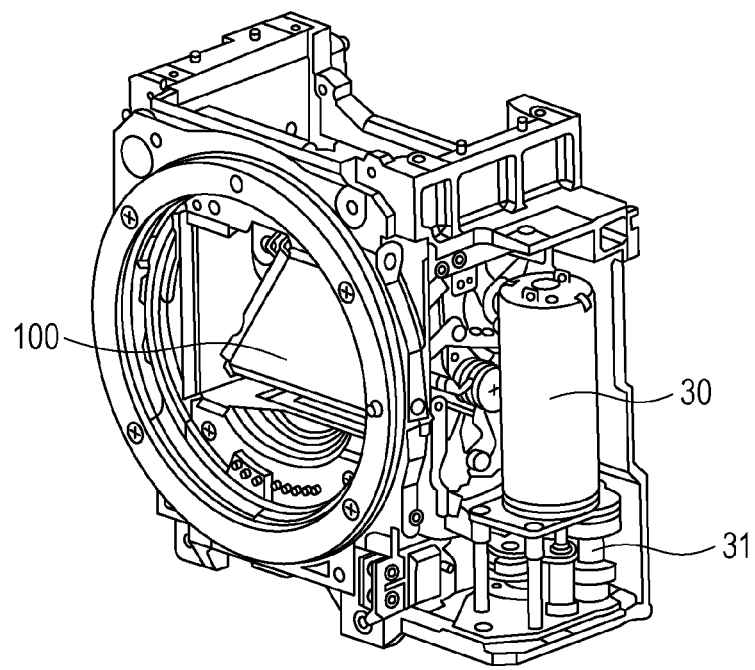
FIGS. 10A to 10C are explanatory views illustrating the detailed structure of a mirror box.
Figure 10B:
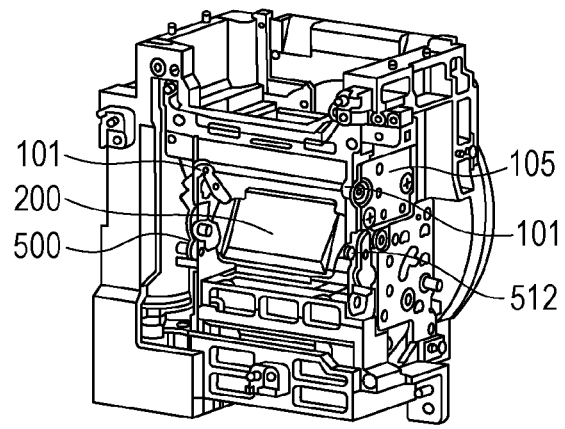
Figure 10C:
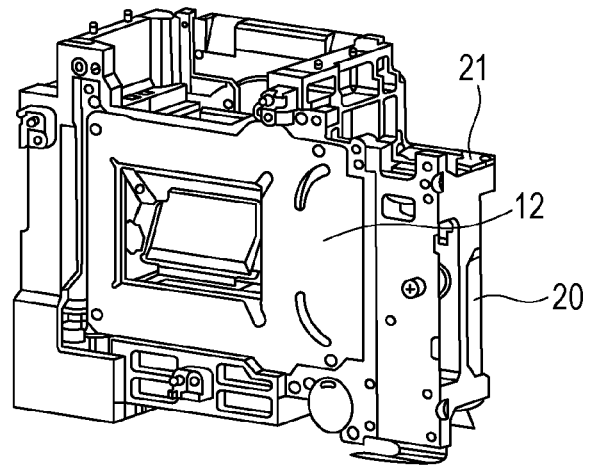

FIGS. 10A to 10C are explanatory views illustrating the detailed structure of the mirror box. FIG. 10A is a front perspective view of the mirror box, and FIG. 10B is a rear perspective view of the mirror box. FIG. 10C is a rear perspective view illustrating a state where the shutter device 12, illustrated in FIG. 9, is mounted to the mirror box.

The mirror driving mechanism, illustrated in FIGS. 2A to 2C, is disposed at both sides of the mirror box, and a mirror charge mechanism 31 and a mirror charge motor 30 are disposed at one side of the mirror driving mechanism.

In this embodiment, when looking at the camera from the rear side, the mirror charge mechanism 31 and the mirror charge motor 30 are disposed on the left side with respect to an optical axis, and the shutter device 12 and a shutter charge motor 20 are disposed on the right side of the optical axis.

Methods for adjusting the main mirror 100 and the sub-mirror 200 will be described below.

Positioning of the rotation shafts 101 of the main mirror 100 is made such that the rotation shaft 101 on the left side is engaged in a hole formed in the base plate 300 of the mirror driving mechanism and the rotation shaft 101 on the right side is fitted to an adjustment plate 105 (see FIG. 10B). The position of the rotation shaft 101 of the main mirror 100 on the right side can be adjusted by adjusting the position of the adjustment plate 105.

In the above description, the angle of the main mirror 100 in the rotating direction thereof is determined by the contact plate 103 of the main mirror 100 contacting with the contact shaft 402 and by the contact plate 104 of the main mirror 100 contacting with the contact shaft 412. More precisely speaking, however, the contact between the contact plate 103 of the main mirror 100 and the contact shaft 402 and the contact between the contact plate 104 of the main mirror 100 and the contact shaft 412 do not occur at the same time.

In other words, when the main mirror 100 is displaced to the mirror-down state, at the time either one of the contact between the contact plate 103 of the main mirror 100 and the contact shaft 402 and the contact between the contact plate 104 of the main mirror 100 and the contact shaft 412 is established, the contact between the contact plate and the contact shaft relating to the other contact is not yet established and a gap still remains between them.

More specifically, a plane is determined by contacts at three points. In this embodiment, a plane of the main mirror 100 when the main mirror 100 is displaced to the mirror-down state is determined by contacts at three points that are provided by two bearing portions bearing the rotation shafts 101 of the main mirror 100, and one of the contact shaft 402 and the contact shaft 412.

In this embodiment, the contact plate 103 of the main mirror 100, which is positioned on the left side where the adjustment of the position of the rotation shaft 101 of the main mirror 100 cannot be made, is brought into contact with the contact shaft 402 at earlier timing. Thereafter, the contact plate 104 of the main mirror 100, which is positioned on the right side where the adjustment of the position of the rotation shaft 101 of the main mirror 100 can be made depending on the position of the adjustment plate 105, is brought into contact with the contact shaft 412.

With such an arrangement, the angle of the main mirror 100 in the rotating direction thereof can be adjusted on the basis of the side where the rotation shaft 101 of the main mirror 100 is fixedly held. If the angle of the main mirror 100 in the rotating direction thereof is adjusted on the basis of the side where the rotation shaft 101 of the main mirror 100 is movable, this implies that the angle of the main mirror 100 in the rotating direction thereof is adjusted on the basis of the side including an error. Stated another way, an error related to the position of the rotation shaft 101 of the main mirror 100 affects the angle of the main mirror 100 in the rotating direction thereof.

Similarly, in the above description, the angle of the sub-mirror 200 in the rotating direction thereof is determined by the contact portion 201 of the sub-mirror frame 200a contacting with the contact shaft 502 and by the contact portion 202 of the sub-mirror frame 200a contacting with the contact shaft 512.

More precisely speaking, however, the contact between the contact portion 201 of the sub-mirror frame 200a and the contact shaft 502 and the contact between the contact portion 202 of the sub-mirror frame 200a and the contact shaft 512 do not occur at the same time. In other words, when the sub-mirror 200 is displaced to the mirror-down state, at the time either one of the contact between the contact portion 201 of the sub-mirror frame 200a and the contact shaft 502 and the contact between the contact portion 202 of the sub-mirror frame 200a and the contact shaft 512 is established, the contact between the contact plate and the contact shaft relating to the other contact is not yet established and a gap still remains between them.

In this embodiment, a plane of the sub-mirror 200 when the sub-mirror 200 is displaced to the mirror-down state is determined by contacts at three points that are provided by two bearing portions bearing the rotation shaft of the sub-mirror 200, and one of the contact shaft 502 and the contact shaft 512.

In this embodiment, the contact portion 202 of the sub-mirror frame 200a is contacted with the contact shaft 512, the contact portion 202 and the contact shaft 512 being positioned on the right side of the main mirror 100 where the angle of the main mirror 100 in the rotating direction thereof is not fixedly set. On the other hand, the contact portion 201 of the sub-mirror frame 200a is not contacted with the contact shaft 502, the contact portion 201 and the contact shaft 502 being positioned on the left side of the main mirror 100 where the angle of the main mirror 100 in the rotating direction thereof is fixedly set.

Thus, in this embodiment, a mechanism for defining the plane of the sub-mirror 200 when the sub-mirror 200 is displaced to the mirror-down state and a mechanism for defining the plane of the main mirror 100 when the main mirror 100 is displaced to the mirror-down state are positioned in a diagonal relationship.

During a period from a time when the main mirror 100 has come into contact with the main mirror balancer 400 positioned on the left side to a time when the main mirror 100 comes into contact with the main mirror balancer 410 positioned on the right side, there occurs a force acting on the main mirror 100 to incline the same.

Similarly, during a period from a time when the sub-mirror 200 has come into contact with the sub-mirror balancer 510 positioned on the right side to a time when the sub-mirror 200 comes into contact with the sub-mirror balancer 500 positioned on the left side, there occurs a force acting on the sub-mirror 200 to incline the same. However, since the force acting on the main mirror 100 to incline the same and the force acting on the sub-mirror 200 to incline the same are opposed to each other in direction, the accuracy in positioning the main mirror 100 and the sub-mirror 200 is improved.

Further, in this embodiment, the main mirror 100 first comes into contact with the main mirror balancer 400 positioned on the left side, and then comes into contact with the main mirror balancer 410 positioned on the right side. On the other hand, the sub-mirror 200 first comes into contact with the sub-mirror balancer 510 positioned on the right side, and then comes into contact with the sub-mirror balancer 500 positioned on the left side.

As a result, shocks generated when the main mirror 100 and the sub-mirror 200 are displaced to the mirror-down state can be distributed to the left side and the right side, and the shocks can be settled in a shorter time.

The present invention has been described in detail above in connection with the embodiment. The embodiment of the present invention has been described in connection with a single-lens reflex digital camera, for example, in which a lens is interchangeable, but the present invention can also be embodied in a structure that a camera body and a lens are integral with each other and the lens is not interchangeable.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-086513 filed Apr. 8, 2011, which is hereby incorporated by reference herein in its entirety.

What is claimed is:

1. A camera comprising:
 a mirror;
 a mirror contact member with which the mirror is contactable; and
 a bounce regulation member including a bounce regulation portion with which the mirror is contacted when the mirror is bounced from the mirror contact member;
 wherein the mirror contact member is provided so as to be rotatable around a rotation center,
 wherein the mirror contact member includes a first eccentric portion that is eccentric with respect to the rotation center of the mirror contact member, and a second eccentric portion that is eccentric with respect to the rotation center of the mirror contact member substantially at the same eccentricity as that of the first eccentric portion,
 wherein when the mirror is displaced to a mirror-down state, the mirror is contacted with the first eccentric portion, and
 wherein the bounce regulation member is disposed to be rotatable about the second eccentric portion.

2. The camera according to claim 1, further comprising:
 a rotation member arranged to be rotated when the mirror and the mirror contact member are contacted with each other,
 wherein the mirror contact member and the bounce regulation member are provided on the rotation member.

3. The camera according to claim 2, wherein the bounce regulation member is held between the mirror contact member and the rotation member.

4. The camera according to claim 2, further comprising:
 a biasing member arranged to bias the rotation member,
 wherein the biasing member biases the rotation member in a direction opposed to a direction in which the rotation member is rotated when the mirror and the mirror contact member are contacted with each other, and
 wherein the biasing member biases the bounce regulation member.

* * * * *